United States Patent
Kakulamarri et al.

(10) Patent No.: US 10,884,973 B2
(45) Date of Patent: Jan. 5, 2021

(54) SYNCHRONIZATION OF AUDIO ACROSS MULTIPLE DEVICES

(71) Applicant: Microsoft Technology Licensing, LLC, Redmond, WA (US)

(72) Inventors: Laxmi Narsimha Rao Kakulamarri, Redmond, WA (US); Edward Sumanaseni, Sammamish, WA (US); Egidio Sburlino, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 35 days.

(21) Appl. No.: 16/428,088

(22) Filed: May 31, 2019

(65) Prior Publication Data

US 2020/0379942 A1  Dec. 3, 2020

(51) Int. Cl.
*G06F 3/16* (2006.01)
*G06F 13/42* (2006.01)
*H04R 3/12* (2006.01)

(52) U.S. Cl.
CPC .......... *G06F 13/4291* (2013.01); *G06F 3/162* (2013.01); *G06F 2213/0042* (2013.01)

(58) Field of Classification Search
CPC ...... G06F 13/4291; G06F 3/162; G06F 3/165; H04R 2499/15; H04R 3/12
See application file for complete search history.

(56) References Cited

U.S. PATENT DOCUMENTS

| 7,577,757 B2 | 8/2009 | Carter et al. |
| 7,953,118 B2 | 5/2011 | Krantz et al. |

(Continued)

FOREIGN PATENT DOCUMENTS

| EP | 2800004 A1 | 11/2014 |
| WO | 2004008330 A1 | 1/2004 |
| WO | 2018/152242 A1 | 8/2018 |

OTHER PUBLICATIONS

"Configure or Change Reputation Score Factors and Weights", Retrieved from: https://community.telligent.com/community/8/w/user-documentation/47769/configure-or-change-reputation-score-factors-and-weights, Retrieved Date: Oct. 17, 2019, 4 Pages.

(Continued)

*Primary Examiner* — David E Martinez
(74) *Attorney, Agent, or Firm* — Ray Quinney & Nebeker; Tiffany Healy

(57) ABSTRACT

Methods and devices for synchronizing audio among a plurality of display devices in communication with a computer device may include determining a plurality of audio data subsets with audio data from an audio stream to transmit to a plurality of display devices in communication with the computer device via a universal serial bus (USB) connection. The methods and devices may include obtaining a current frame number of a display device render buffer from a first display device of the plurality of display devices. The methods and devices may include determining an updated frame number by adding a constant to the current frame number; and generating a plurality of USB request blocks with the updated frame number and packets with the plurality of audio data subsets. The methods and devices may include sending the USB request blocks to a corresponding display device of the plurality of display devices.

20 Claims, 5 Drawing Sheets

(56) References Cited

U.S. PATENT DOCUMENTS

| | | | |
|---|---|---|---|
| 8,200,587 B2 | 6/2012 | Deyo | |
| 8,234,395 B2 | 7/2012 | Millington | |
| 8,681,822 B2* | 3/2014 | Bradley | H04N 21/8547 370/503 |
| 9,319,792 B1* | 4/2016 | Coleman | G06F 3/165 |
| 10,366,347 B2 | 7/2019 | Tofighbakhsh | |
| 2008/0134282 A1 | 6/2008 | Fridman et al. | |
| 2010/0042238 A1* | 2/2010 | Moore | G06F 3/165 700/94 |
| 2014/0358520 A1 | 12/2014 | Davey | |
| 2015/0070516 A1 | 3/2015 | Shoemake et al. | |
| 2018/0233136 A1* | 8/2018 | Torok | G06F 3/165 |
| 2019/0052471 A1 | 2/2019 | Panattoni et al. | |
| 2020/0014742 A1* | 1/2020 | Pollet | H04L 65/80 |

OTHER PUBLICATIONS

"Protect Your Community from Abusive User-Generated Content", Retrieved from: https://web.archive.org/web/20190826232641/https://www.twohat.com/community-sift/, Aug. 26, 2019, 5 Pages.

"Use of AI in Online Content Moderation", In Report of OFCOM, Jul. 18, 2019, 84 Pages.

Abramson, et al., "Non Provisional Application filed as U.S. Appl. No. 16/582,324", filed Sep. 25, 2019, 24 Pages.

"USB Audio Simplified", Retrieved From: https://web.archive.org/web/20170829194008/https://www.silabs.com/documents/public/white-papers/usb-audio-simplified.pdf, Retrieved On: Aug. 29, 2017, pp. 1-5.

David, "Play Same Song on Multiple Phones Simultaneously", Retrieved From: https://7labs.io/mobile/music-in-sync-on-multiple-devices.html, Retrieved On: Apr. 15, 2019, 11 Pages.

Singh, Laxman, "Speakerblast: Play Same Music on Multiple Devices from Any Location", Retrieved From: http://www.ilovefreesoftware.com/03/webware/speakerblast-play-same-music-on-multiple-devices.html, Feb. 3, 2014, 5 Pages.

Singh, Amanpreet, "USB Protocol: Types of USB Packets and USB Transfers (Part 2/6)", Retrieved From: https://www.engineersgarage.com/articles/usb-protocol-types-usb-packets-and-usb-transfers-part-26, Retrieved On: Apr. 15, 2019, 5 Pages.

"International Search Report and Written Opinion Issued in PCT Application No. PCT/US20/029183", dated Jul. 17, 2020, 12 Pages.

"Universal Serial Bus Device Class Definition for Audio Devices", Retrieved From https://www.usb.org/developers/docs/devclass_docs/audio10.pdf, Mar. 18, 1998, 130 Pages.

* cited by examiner

SYNCHRONIZATION OF AUDIO ACROSS MULTIPLE DEVICES

BACKGROUND

The present disclosure relates to multiple devices in communication with a computer device.

When you have multiple devices connected in a room for a meeting, each device may be used to emit audio. Each audio unit device may run a little bit faster or slower than the other devices. This speed characteristic may affect audio because when audio is played through the devices, the audio may not be played at the intended time, creating a distortion. As such, the audio experience may be unpleasant to individuals interacting with the devices during the meeting.

Thus, there is a need in the art for improvements in synchronizing multiple independent USB audio devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, at least one processor configured to communicate with the memory, and an operating system configured to communicate with the memory and the processor, wherein the operating system is operable to: determine a plurality of audio data subsets with audio data from an audio stream to transmit to a plurality of display devices in communication with the computer device via a universal serial bus (USB) connection; obtain a current frame number of a display device render buffer from a first display device of the plurality of display devices; determine an updated frame number by adding a constant to the current frame number; generate a plurality of USB request blocks, where each USB request block of the plurality of USB request blocks includes the updated frame number and a packet with one audio data subset of the plurality of audio data subsets; and send each USB request block of the plurality of USB request blocks to a corresponding display device of the plurality of display devices.

Another example implementation relates to a method for synchronizing audio data among a plurality of display devices in communication with a computer device. The method may include determining, at an operating system executing on the computer device, a plurality of audio data subsets with audio data from an audio stream to transmit to a plurality of display devices in communication with the computer device via a universal serial bus (USB) connection. The method may include obtaining a current frame number of a display device render buffer from a first display device of the plurality of display devices. The method may include determining an updated frame number by adding a constant to the current frame number. The method may include generating a plurality of USB request blocks, where each USB request block of the plurality of USB requests blocks includes the updated frame number a packet with one audio data subset of the plurality of audio data subsets. The method may include sending each USB request block of the plurality of USB request blocks to a corresponding display device of the plurality of display devices.

Another example implementation relates to computer-readable medium storing instructions executable by a computer device. The computer-readable medium may include at least one instruction for causing the computer device to determine a plurality of audio data subsets with audio data from an audio stream to transmit to a plurality of display devices in communication with the computer device via a universal serial bus (USB) connection. The computer-readable medium may include at least one instruction for causing the computer device to obtain a current frame number of a display device render buffer from a first display device of the plurality of display devices. The computer-readable medium may include at least one instruction for causing the computer device to determine an updated frame number by adding a constant to the current frame number. The computer-readable medium may include at least one instruction for causing the computer device to generate a plurality of USB request blocks, wherein each USB request block of the plurality of USB request blocks includes the updated frame number and a packet with one audio data subset of the plurality of audio data subsets. The computer-readable medium may include at least one instruction for causing the computer device to send each USB request block of the plurality of USB request blocks to a corresponding display device of the plurality of display devices.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
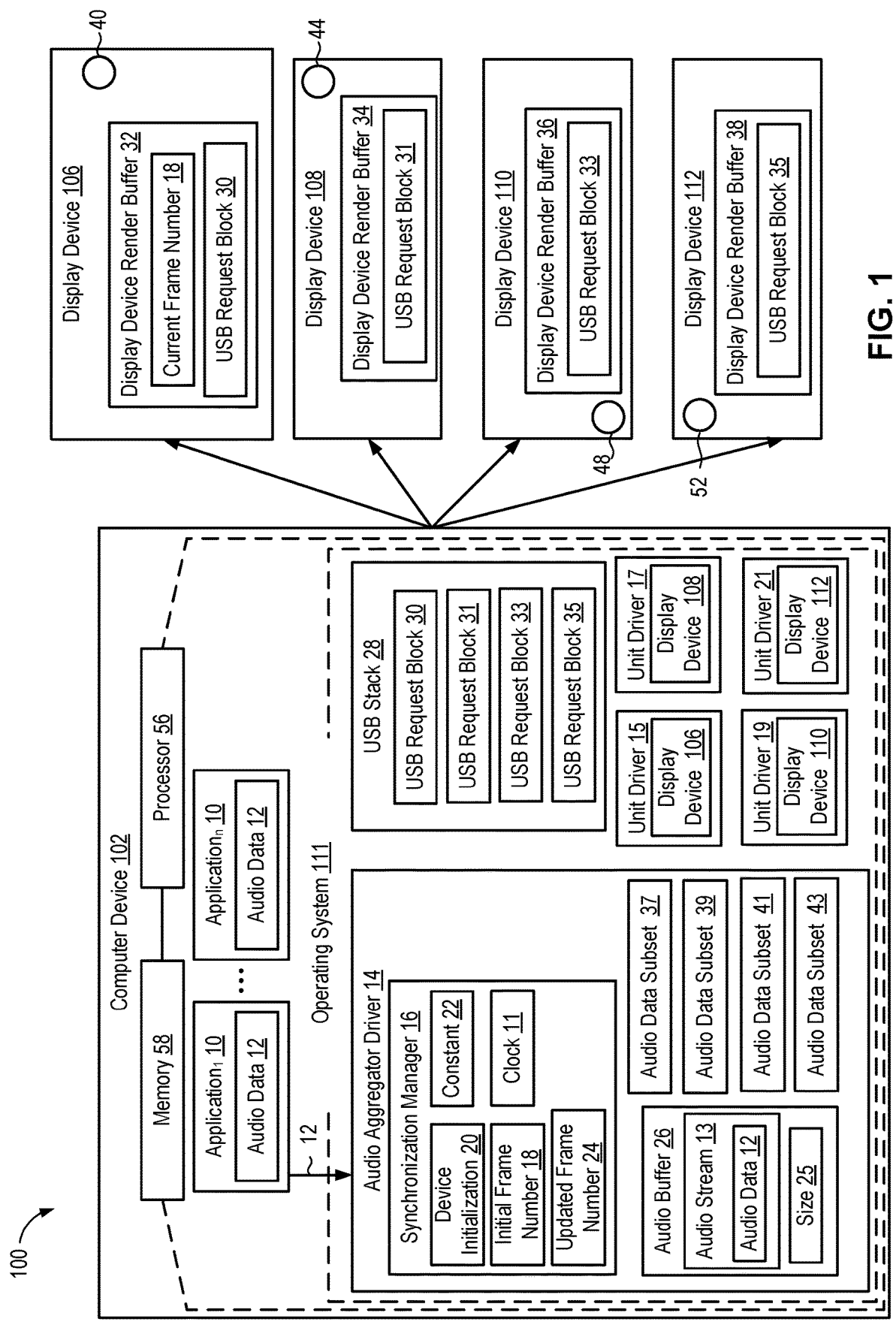
FIG. 1 is a schematic block diagram of an example computer device in communication with a plurality of display devices in accordance with an implementation of the present disclosure.

This disclosure relates to devices and methods for synchronizing audio across multiple display devices in communication with a computer device. The display devices and the computer device are connected to the same universal serial bus (USB) so that one common data stream of audio data may be partitioned into a plurality of audio data subsets for each of the display devices. The plurality of audio data subsets may be supplied to all of the display devices from the computer device with a starting frame number so that all of the display devices start outputting the audio data subsets at the same. The transfer of the audio data may also occur without the starting frame number. When the starting frame number is missing, the display devices may output the audio data as soon as possible, which may lead to the receipt of the audio data being unsynchronized between the devices. The methods and devices may specify a timing indicator, such as a frame number, when transferring the audio data from the computer device to the display devices. For example, in some implementations, the frame number may be specified in a USB request block (URB) sent to the display devices. By setting a frame number, the output of the audio data is started at a time that matches the frame number, which allows for synchronizing the audio data across all display devices. The display devices may use the same USB clock as the source for the audio data clock for each display device when synchronizing the audio data.

The display devices may have at least one display and a corresponding audio input and/or audio output. The display devices may be any type of display, monitor, visual presentation device, computer device, and/or physical panel capable of presenting information, capturing audio, and/or emitting audio. Each display device may include any number of channels (e.g., speakers) for capturing audio or emitting audio. Each speaker of display devices may correspond to any number of channels. For example, the speakers may be two channel stereo with a left channel and a right channel.

The devices and methods may include an audio aggregator driver that may receive audio data from one or more applications executing on the computer device. The audio aggregator driver may generate an audio stream with the plurality of audio data received and may store the audio stream in an audio buffer. The size of the audio buffer may be determined by multiplying a total number of display devices in communication with the computer device by a number of audio channels supported by each display device. In addition, a sequencing may be applied to the plurality of display devices that defines an order in which the display devices are connected and/or in communication with the computer device. The audio data may be placed in the audio steam using the sequencing.

In an implementation, the devices and methods may use two layers of drivers, such as the audio aggregator driver on the computer device and a plurality of unit drivers on the computer device. Each unit driver may be associated with one of the plurality of display devices so that each display device may be represented on the computer device through the unit driver. In addition, each unit driver may communicate with a display device render buffer that may receive audio data to output via speakers on the display device. The unit drivers may transmit the audio data to the display devices.

Audio aggregator driver may include a synchronization manager that may synchronize the transmission of the audio data to the display devices. Synchronization manager may include a clock or other timing mechanism that may be used to set a timing for the unit drivers on computer device. For example, the clock may be a USB clock. The timing may be used to synchronize the transmissions to the display devices.

Synchronization manager may receive a current frame number of the display device render buffer from a first unit driver associated with a first display device. For example, synchronization manager may receive the current frame number from the unit driver associated with the first display device. The current frame number may correspond to a timing of the clock. For high speed and super speed display devices, a data transfer rate may be a micro frame. The length of a micro frame is 125 microseconds and eight consecutive micro frames constitute one high-speed or super speed frame. As such, the length of one frame may be 1 millisecond.

Synchronization manager may determine a constant that accounts for a delay in performing a device initialization to move all the display devices to a run state capable of receiving audio data to output via speakers on the display devices. Synchronization manager may calculate an updated frame number by adding the constant to the current frame number. The updated frame number may be the specified timing indicator that may ensure the audio data is supplied and/or transmitted to each of the display devices at the same time. The audio aggregator driver may generate one or more subsets of audio data from the audio stream for transmission to each of the display devices. The audio aggregator driver may send a subset of audio data to each unit driver, along with the updated frame number for transmission to the display devices.

Each unit driver may generate a USB request block with the updated frame number and one or more packets with a subset of audio data for a respective display device. A USB stack may receive the USB request blocks from each of the unit drivers and may send the USB request blocks to the respective display devices. The unit drivers may ensure that the display device render buffers start outputting the subset of audio data from the USB request blocks at the updated frame number. The updated frame number on each display device render buffer at any given point may be the same, allowing for meeting an expectation that the synchronization between all the display devices may occur within a micro frame.

By setting a time in the future to transmit the audio data that allows enough time for initialization of the display devices into a run state, there may be a guarantee that the USB bus will deliver the audio data to all of the display devices at the exact same time. As such, the audio emitted from the speakers of the display devices may be synchronized.

Referring now to FIG. 1, illustrated is a system 100 for use with synchronizing audio across a plurality of display devices 106, 108, 110, 112 in communication with a computer device 102 via a USB connection. Display devices 106, 108, 110, 112 and computer device 102 may be connected to the same universal serial bus (USB). As such, computer device 102 may act as the USB host controller for all of display devices 106, 108, 110, 112 and one common USB clock may be supplied to all of display devices 106, 108, 110, 112 from computer device 102 so that all of the display devices 106, 108, 110, 112 may use the same USB clock as the source for the audio data clock.

The plurality of display devices 106, 108, 110, 112 may be any type of display, monitor, visual presentation device, computer device, and/or physical panel capable of presenting information, capturing audio, and/or emitting audio. In addition, each display device 106, 108, 110, 112, may include any number of channels for capturing audio and/or emitting audio. For example, display device 106 may include a speaker 40 that supports two channels (e.g., right and left). Display device 108 may include a speaker 44 that supports two channels (e.g., right and left). Display device 110 may include a speaker 48 that supports two channels (e.g., right and left). Display device 112 may include a speaker 52 that supports two channels (e.g., right and left). Each speaker 40, 44, 48, 52 of display devices 106, 108, 110, 112 may correspond to any number of channels. Display devices 106, 108, 110, 112 may be non-computing devices, computing devices, or a combination of non-computing devices and computing devices.

Each of the plurality of display devices 106, 108, 110, 112 may be represented on computer device 102 with a corresponding unit driver 15, 17, 19, 21. For example, unit driver 15 may be associated with display device 106, unit driver 17 may be associated with display device 108, unit driver 19 may be associated with display device 110, and unit driver 21 may be associated with display device 112. Unit drivers 15, 17, 19, 21 may communicate with speakers 40, 44, 48, 52 of display devices 106, 108, 110, 112.

In addition, each display device 106, 108, 110, 112 may include an audio buffer per audio device entity used to capture and/or output audio. For example, the plurality of display devices 106, 108, 110, 112 may include individual display device render buffers 32, 34, 36, 38 that may receive audio data 12 or audio data subsets 37, 39, 41, 43 to output via speakers 40, 44, 48, 52. Unit drivers 15, 17, 19, 21 may communicate with display device render buffers 32, 34, 36, 38, and may receive channel-specific audio data 12, or audio data subsets 37, 39, 41, 43, for the corresponding display device render buffers 32, 34, 36, 38.

A timing indicator, such as an updated frame number 24, may be used when transferring the audio data 12, or audio data subsets 37, 39, 41, 43, from computer device 102 to the display device render buffers 32, 34, 36, 38. By setting the updated frame number 24 at a time in the future, the output of the audio data 12 or audio data subsets 37, 39, 41, 43 is started at a time that matches the updated frame number 24, which allows for synchronizing the audio data 12, or audio data subsets 37, 39, 41, 43, across all display devices 106, 108, 110, 112 so that audio may be output via speakers 40, 44, 48, 52 at the same time.

Computer device 102 may include any mobile or fixed computer device, which may be connectable to a network. Computer device 102 may be, for example, a computer device such as a desktop or laptop or tablet computer, an internet of things (TOT) device, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 102 may include an operating system 111 that may be executed by processor 48 and/or memory 50. Memory 50 of computer device 102 may be configured for storing data and/or computer-executable instructions defining and/or associated with operating system 111, and processor 48 may execute such data and/or instructions to instantiate operating system 111. An example of memory 50 can include, but is not limited to, a type of memory usable by a computer, such as random access memory (RAM), read only memory (ROM), tapes, magnetic discs, optical discs, volatile memory, non-volatile memory, and any combination thereof. An example of processor 48 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 111 may include an audio aggregator driver 14 that that may receive audio data 12 from one or more applications 10 executing on computer device 102. Audio aggregator driver 14 may generate an audio stream 13 with the plurality of audio data 12 received and may store the audio stream 13 in an audio buffer 26. Audio aggregator driver 14 16 may determine a buffer size 25 for the audio buffer 26. The buffer size 25 may be calculated by multiplying the total number of display devices 106, 108, 110, 112 by the number of channels supported by each of the display devices 106, 108, 110, 112. In the illustrated example, display devices 106, 108, 110, 112 may each support two channels (e.g., speakers 40, 44, 48, 52 may support two channels, right and left). As such, the buffer size 25 may be eight (e.g., four devices multiplied by two channels).

A sequencing may be applied to display devices 106, 108, 110, 112. The sequencing may have an arrangement (or relative position) based on a value of an order in which display devices 106, 108, 110, 112 are connected and/or in communication with computer device 102. For example, display device 106 may be a first display device, display device 108 may be a second display device, display device 110 may be a third display device, and display device 112 may be a fourth display device. The audio data 12 may be placed in the audio steam 13 using the sequencing.

Audio aggregator driver 14 may split the audio data 12 from the audio stream 13 into a plurality of audio data subsets 37, 39, 41, 43. The plurality of audio data subsets 37, 39, 41, 43 may be determined in response to a total number of display devices 106, 108, 110, 112 in communication with computer device 102. In the illustrated example, four display devices are in communication with computer device 102. As such, audio aggregated driver 14 may split the audio data 12 from audio stream 13 into four audio data subsets 37, 39, 41, 43 so that each display device 106, 108, 110, 112 may receive one of the audio data subset 37, 39, 41, 43. Audio aggregator driver 14 may send the audio data subsets 37, 39, 41, 43 to the respective unit drivers 15, 17, 19, 21.

Audio aggregator driver 14 may include a synchronization manager 16 that may synchronize the transmission of audio data 12 to display devices 106, 108, 110, 112. Synchronization manager 16 may receive information identifying a number of display devices 106, 108, 110, 112 in communication with computer device 102, along with a sequencing of the display devices 106, 108, 110, 112.

Synchronization manager 16 may include a clock 11 or other timing mechanism that may be used to set a timing for the unit drivers 15, 17, 19, 21 on computer device 102. For example, clock 11 may be the USB clock and display devices 106, 108, 110, 112 may use clock 11 as the source for the audio data clock for each display device 106, 108, 110, 112. The frame numbers of the display device render buffers 32, 34, 36, 38 may relate to the timing of clock 11. As such, the timing of clock 11 may be used to synchronize the audio data subsets 37, 39, 41, 43 output on display devices 106, 108, 110, 112 so the audio data output starts at the same time.

Synchronization manager 16 may receive a current frame number 18 of the display device render buffer 32 from unit driver 15 associated with a first display device (e.g., display device 106). The current frame number 18 may be a current frame number from display device render buffer 32 of display device 106. The current frame number 18 may relate to the timing of clock 11. For high speed and super speed display devices, a data transfer rate may be a micro frame. The length of a micro frame is 125 microseconds and eight consecutive micro frames constitute one high-speed or super speed frame. As such, the length of one frame may be 1 millisecond.

Synchronization manager 16 may determine a constant 22 that accounts for a delay in performing a device initialization 20 to move all display devices 106, 108, 110, 112 to a run state capable of receiving audio data 12 to output via speakers 40, 44, 48, 52 on display devices 106, 108, 110.

The device initialization 20 may including instructing the unit drivers 15, 17, 19, 21 to prepare the display device render buffers 32, 34, 36, 38. The value of constant 22 may provide enough time to initialize all of the display devices 106, 108, 110, 112 into a run state capable of receiving audio data 12. For example, constant 22 may be eight, which may allow eight milliseconds to move all of the display devices 106, 108, 110, 112 into the run state and start streaming audio data 12. Constant 22 may be modified as the time to move display devices 106, 108, 110, 112 increases or decreases. Moreover, constant 22 may increase and/or decrease as the number of display devices 106, 108, 110, 112 increase and/or decrease. As such, constant 22 may vary in response to changes in the system, changes in the main system speed, and/or other considerations.

Synchronization manager 16 may calculate an updated frame number 24 by adding the constant 22 to the current frame number 18. The updated frame number 24 may be the specified timing indicator that may ensure that the audio data subsets 37, 39, 41, 43 output on each of the display devices 106, 108, 110, 112 starts at the same time. For example, when the timing of clock 11 matches the updated frame number 24, display devices 106, 108, 110, 112 may start outputting the audio data subsets 37, 39, 41, 43.

The audio aggregator driver may send the updated frame number 24 and the audio data subsets 37, 39, 41, 43 to the unit drivers 15, 17, 19, 21 for transmission to the display devices 106, 108, 110, 112. Each unit driver 15, 17, 19, 21 may generate one or more USB requests blocks 30, 31, 33, 35 for the respective display device 106, 108, 110, 112. The USB requests blocks 30, 31, 33, 35 may include the updated frame number 24 and one or more packets 23, 25, 27, 29 (FIG. 3) of audio data subsets 37, 39, 41, 43. By setting the updated frame number 24 when transferring USB request blocks 30, 31, 33, 35, the display device render buffers 32, 34, 369, 38 may receive the audio data subsets 37, 39, 41, 43 and may wait to start to output the audio data subsets 37, 39, 41, 43 until the timing of clock 11 matches the updated frame number 24. As such, synchronizing the output of the subsets of audio data 37, 39, 41, 43, across all display devices 106, 108, 110, 112 may occur by setting a time in the future using the updated frame number 24 to start the output of the subsets of audio data 37, 39, 41, 43.

A USB stack 28 may receive the USB request block(s) 30, 31, 33, 35 from unit drivers 15, 17, 19, 21 and may send the USB request blocks 30, 31, 33, 35 to display devices 106, 108, 110, 112.

As such, the display device render buffers 32, 34, 36, 38 may receive a respective subset of audio data 37, 39, 41, 43 from the USB request blocks 30, 31, 33, 35 with the updated frame number 24. Display devices 106, 108, 110, 112 may start outputting the subset of audio data 37, 39, 41, 43 via speakers 40, 44, 48, 52 when the timing of clock 11 matches the updated frame number 24. The updated frame number 24 on each display device render buffer 32, 34, 36, 38 at any given point may be the same, allowing for meeting an expectation that the synchronization between all display devices 106, 108, 110, 112 may occur within a micro frame. The updated frame number 24 may be kept up to date by synchronization manager 16 as USB request blocks 30, 31, 33, 35 are transferred from USB stack 28.

By setting a time in the future to start outputting the subsets of audio data 37, 39, 41, 43, that allows enough time to copy the subsets of audio data 37, 39, 41, 43 into the display device render buffers 32, 34, 36, 38, there may be a guarantee that the USB bus will deliver the subsets of audio data 37, 39, 41, 43 to all of the display devices 106, 108, 110, 112 at the exact same time. As such, the audio emitted from the speakers 40, 44, 48, 52 of display devices 106, 108, 110, 112 may be synchronized.

Figure 2:
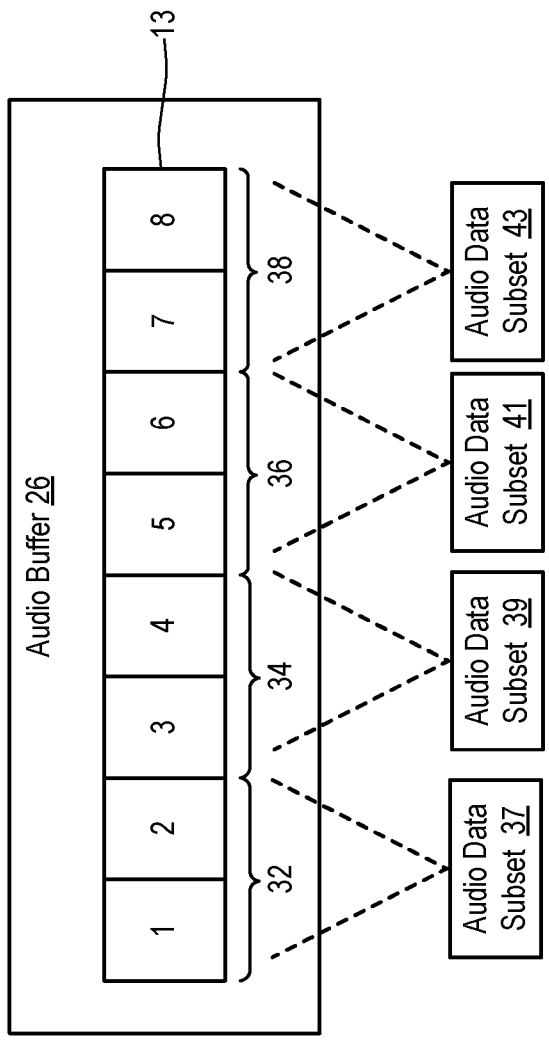
FIG. 2 is an example of an audio buffer in accordance with an implementation of the present disclosure.

Referring now to FIG. 2, an example audio buffer 26 may include an audio stream 13 with audio data 12 received from one or more applications 10 (FIG. 1). Audio buffer 26 may include audio streams 13 corresponding to different time/sequences of received audio data 12.

Audio aggregator driver 14 may partition audio buffer 26 into a number of sections corresponding to the buffer size 25 (FIG. 1). For example, when the buffer size 25 is equal to eight, audio buffer 26 may be partitioned into eight sections, where each individual section may correspond to a single channel supported by display devices 106, 108, 110, 112. As such, audio buffer 26 may include an array of eight sections of audio data 12 (at each time/sequence).

A subset of the number of sections may be allocated to a specific display device render buffer 32, 34, 36, 38 in response to a number of channels supported by display devices 106, 108, 110, 112. For example, each display device 106, 108, 110, 112 may receive a subset of two sections in audio buffer 26 because display devices 106, 108, 110, 112 support two channels in the illustrated example. A plurality of audio data subsets 37, 39, 41, 43 may be generated that correspond to the sections of audio buffer 26 of the respective display device render buffers 32, 34, 36, 38.

A sequencing may be applied to the number of sections so that each section may correspond to a specific display device render buffer 32, 34, 36, 38. The sequencing may have an arrangement (or relative position) based on a value of an order in which display devices 106, 108, 110, 112 are connected and/or in communication with computer device 102. For example, display device 106 may be a first display device and the first two sections of audio buffer 26 may be allocated to display device render buffer 32. As such, display device render buffer 32 may receive audio data subset 37, from the first two section of audio buffer 26.

Display device 108 may be the second display device and the next two sections of audio buffer 26 may correspond to display device render buffer 24. Display device render buffer 34 may receive audio data subset 39, from the next two sections of audio buffer 26. Display device 110 may be the third display device and the following two sections of audio buffer 26 may be associated with display device render buffer 36. As such, display device render buffer 36 may receive audio data subset 41, from the following two sections of audio buffer 26. Display device 112 may be the fourth display device and the last two sections of audio buffer 26 may correspond to display device render buffer 38. Display device render buffer 38 may receive audio data subset 43, from the last two sections of audio buffer 26.

Figure 3:
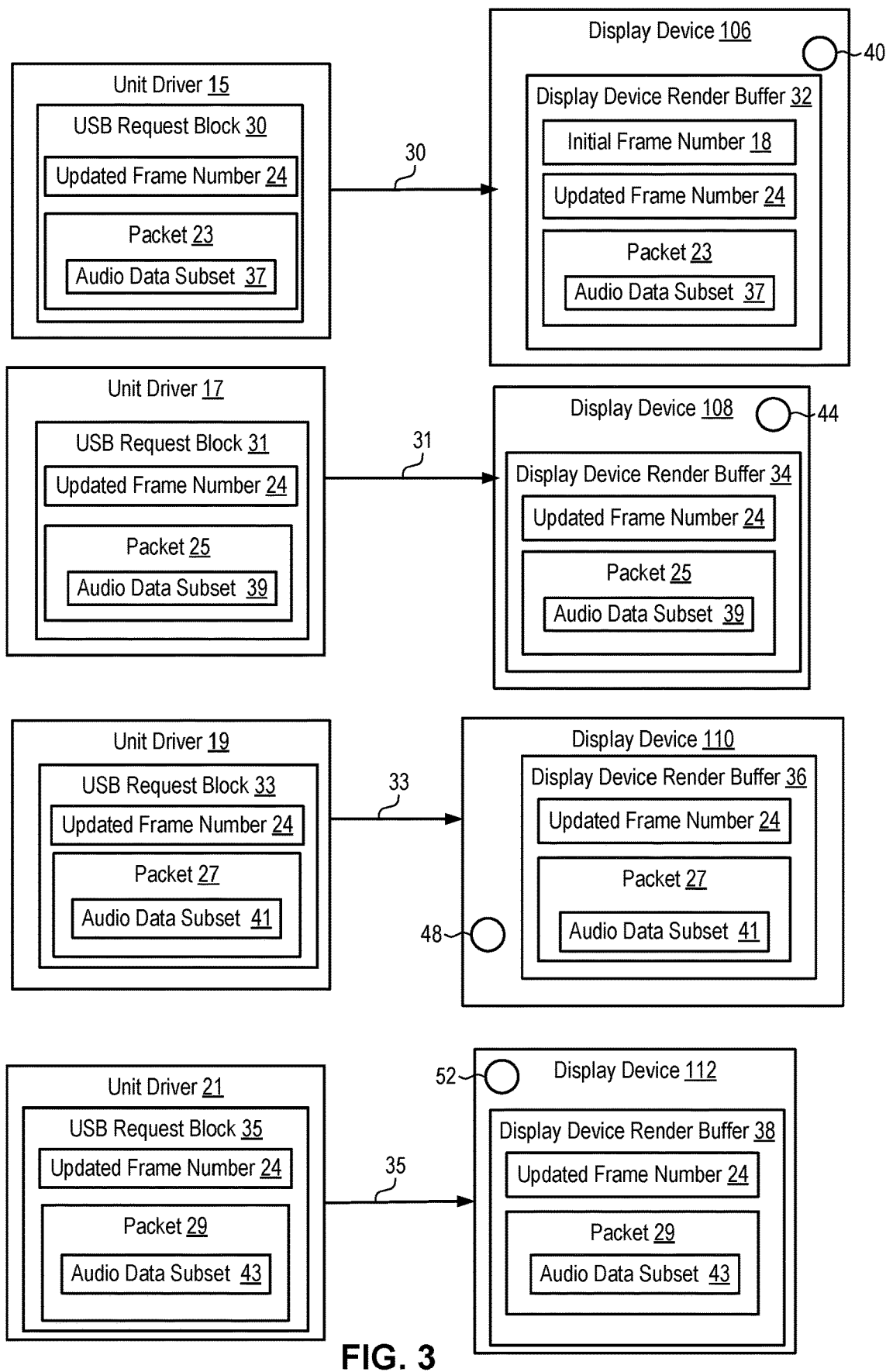
FIG. 3 is an example of sending a plurality of universal serial bus (USB) request blocks to a plurality of display devices in accordance with an implementation of the present disclosure.

Referring now to FIG. 3, illustrated is an example of sending USB request blocks 30, 31, 33, 35 to a plurality of display devices 106, 108, 110, 112. Each unit driver 15, 17, 19, 21 may generate a USB request block 30, 31, 33, 35 with an updated frame number 24 and a packet 23, 25, 27, 29 of audio data to transmit to a respective display device 106, 108, 110, 112.

For example, unit driver 15 may send the USB request block 30 to display device render buffer 32 of display device 106 with the updated frame number 24 and one or more packets 23 with a subset of audio data 37 for display device 106. Display device render buffer 32 may receive the packets 23 with the subset of audio data 37 and may start to output the subset of audio data 37 via speaker 40 at the update d frame number 24. In addition, unit driver 17 may send the USB request block 31 to display device render buffer 34 with the updated frame number 24 and one or more packets 25 with a subset of audio data 39 for display device 108. Display device render buffer 34 may receive the packets 25 with the subset of audio data 39 and may start to output the subset of audio data 39 using speaker 44 at the update frame number 24.

Unit driver 19 may send the USB request block 33 to display device render buffer 36 with the updated frame number 24 and one or more packets 27 with a subset of audio data 41 for display device 110. Display device render buffer 36 may receive the packets 27 with the subset of audio data 41 and may start to output the subset of the audio data 41 via speaker 48 at the updated frame number 24. Unit driver 21 may send a USB request block 35 to display device render buffer 38 with the updated frame number 24 and one or more packets 29 with a subset of audio data 43 for display device 112. Display device render buffer 38 may receive the packets 29 with the subset of audio data 43 and may start to output the subset of the audio data 43, using speaker 52 at the updated frame number.

The audio data subsets 37, 39, 41, 43 may include the same audio data 12. As such, display devices 106, 108, 110, 112 may output the same audio data 12. In addition, the audio data subsets 37, 39, 41, 43 may include different audio data 12 so that each of the display devices 106, 108, 110, 112 may output different audio data 12. The audio data subsets 37, 39, 41, 43 may also include silence when one or more display devices 106, 108, 110, 112 may not need to output audio (e.g., when an application is located on a different display device).

By sending the updated frame number 24 with the packets 23, 25, 27, 29 with the subset of audio data 37, 39, 41, 43 to the display device render buffers 32, 34, 36, 38, the output of the subsets of audio data 37, 39, 41, 43 may be started at a time that matches the updated frame number 24, which allows for synchronizing the subsets of audio data 37, 39, 41, 43 across all display devices 106, 108, 110, 112. As such, the audio emitted from the speakers 40, 44, 48, 52 of display devices 106, 108, 110, 112 may be synchronized.

Figure 4:
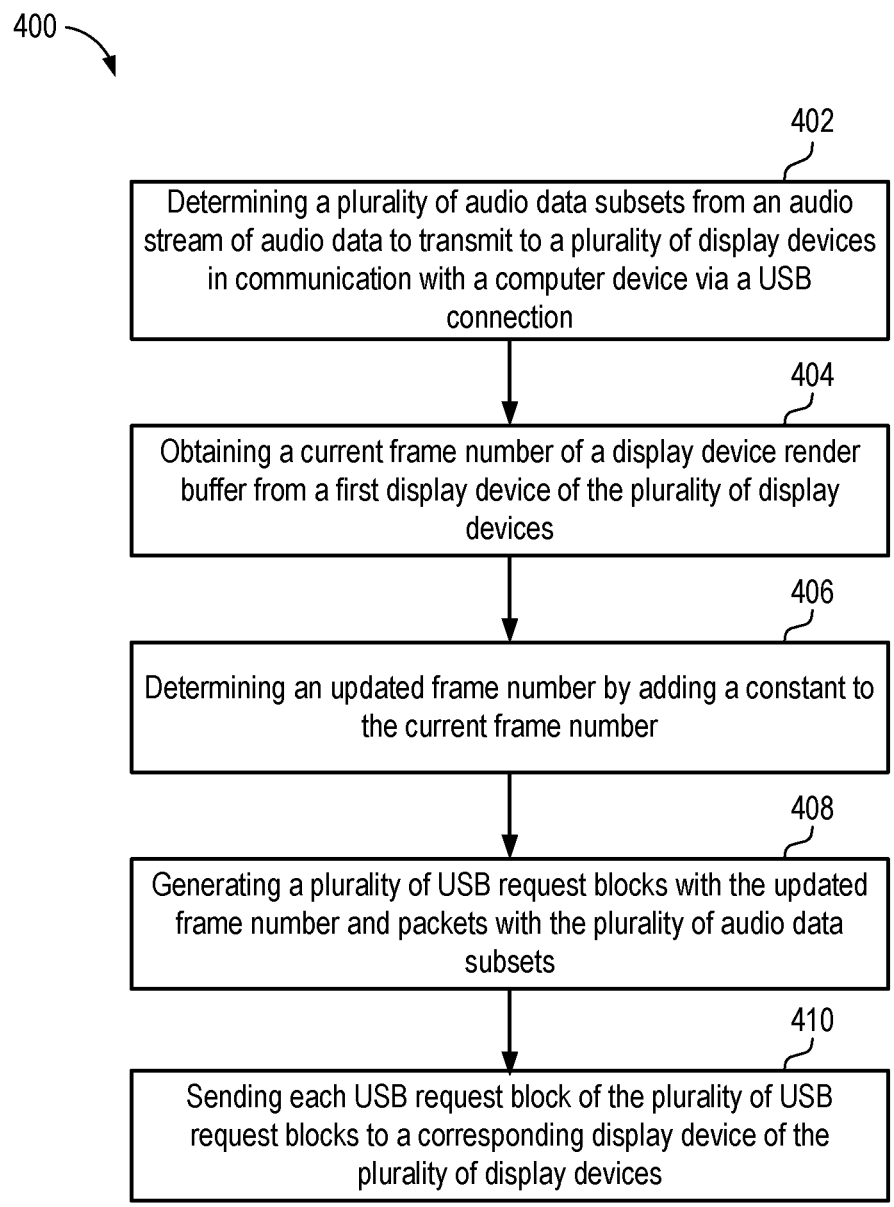
FIG. 4 is an example of a method for synchronizing audio across a plurality of display devices in accordance with an implementation of the present disclosure.

Referring now to FIG. 4, an example method 400 may be used by computer device 102 (FIG. 1) for synchronizing audio data 12 (FIG. 1) across a plurality of display devices 106, 108, 110, 112 (FIG. 1) in communication with computer device 102. The actions of method 400 may be discussed below with reference to the architecture of FIG. 1.

At 402, method 400 may include determining a plurality of audio data subsets from an audio stream of audio data to transmit to a plurality of display devices in communication with a computer device via a USB connection. An audio aggregator driver 14 may receive audio data 12 from one or more applications 10 executing on computer device 102. Audio aggregator driver 14 may generate an audio stream 13 with the plurality of audio data 12 received and may store the audio stream 13 in an audio buffer 26.

Audio aggregator driver 14 may determine a buffer size 25 for the audio buffer 26. The buffer size 25 may be calculated by multiplying the total number of display devices 106, 108, 110, 112 by the number of channels supported by each of the display devices 106, 108, 110, 112. In the illustrated example, display devices 106, 108, 110, 112 may each support two channels (e.g., speakers 40, 44, 48, 52 may support two channels, right and left). As such, the buffer size 25 may be eight (e.g., four devices multiplied by two channels). Audio buffer 26 may also include a plurality of audio streams 13 corresponding to different time/sequences of received audio data 12 so that audio streams 13 may include an array of eight sections of audio data 12 (at each time/sequence for the audio streams 13).

Audio aggregator driver 14 may partition audio stream 13 into a number of sections corresponding to the buffer size 25. For example, when the buffer size 25 is equal to eight, audio stream 13 may be partitioned into eight sections, where each individual section may correspond to a single channel supported by display devices 106, 108, 110, 112. A subset of the number of sections may be allocated to a specific display device render buffer 32, 34, 36, 38 in response to a number of channels supported by display devices 106, 108, 110, 112. For example, each display device 106, 108, 110, 112 may receive a subset of two sections in audio stream 13 because display devices 106, 108, 110, 112 support two channels in the illustrated example.

Audio aggregator driver 14 may split the audio data 12 from the audio stream 13 into a plurality of audio data subsets 37, 39, 41, 43. The plurality of audio data subsets 37, 39, 41, 43 may be determined in response to a total number of display devices 106, 108, 110, 112 in communication with computer device 102. In the illustrated example, four display devices are in communication with computer device 102. As such, audio aggregated driver 14 may split the audio data 12 from audio stream 13 into four audio data subsets 37, 39, 41, 43 so that each display device 106, 108, 110, 112 may receive one of the audio data subset 37, 39, 41, 43.

The audio data 12 from the sections of the audio stream 13 that correspond to the respective display device render buffers 32, 34, 36, 38 may be included in the audio data subsets 37, 39, 41, 43. The audio data subsets 37, 39, 41, 43 may include the same audio data 12. As such, display devices 106, 108, 110, 112 may output the same audio data 12. In addition, the audio data subsets 37, 39, 41, 43 may include different audio data 12 so that each of the display devices 106, 108, 110, 112 may output different audio data 12. The audio data subsets 37, 39, 41, 43 may also include silence when one or more display devices 106, 108, 110, 112 may not need to output audio (e.g., when an application is located on a different display device).

A sequencing may be applied to display devices 106, 108, 110, 112. The sequencing may have an arrangement (or relative position) based on a value of an order in which display devices 106, 108, 110, 112 are connected and/or in communication with computer device 102. For example, display device 106 may be a first display device, display device 108 may be a second display device, display device 110 may be a third display device, and display device 112 may be a fourth display device. The audio data 12 may be placed in the audio steam 13 using the sequencing. In addition, the sequencing may be used in identifying the subset of the number of sections for the display device render buffers 32, 34, 36, 38.

At 404, method 400 may include obtaining a current frame number of a display device render buffer from a first display device of the plurality of display devices. Audio aggregator driver 14 may include a synchronization manager 16 that may include a clock 11 or other timing mechanism that may be used by the computer device and the display devices 106, 108, 110, 112. For example, clock 11 may be a USB clock and display devices 106, 108, 110, 112 may use clock 11 as the source for the audio data clock for each display device 106, 108, 110, 112. The frame numbers of the display device render buffers 32, 34, 36, 38 may relate to the timing of clock 11. As such, the timing of clock 11 may be used to synchronize the audio data between computer device 102 and display devices 106, 108, 110, 112.

Synchronization manager 16 may receive a current frame number 18 of the display device render buffer 32 from unit driver 15 associated with a first display device (e.g., display device 106). The current frame number 18 may be a current frame number from display device render buffer 32 of display device 106 that corresponds to a timing of clock 11. For high speed and super speed display devices, a data transfer rate may be a micro frame. The length of a micro frame is 125 microseconds and eight consecutive micro frames constitute one high-speed or super speed frame. As such, the length of one frame may be 1 millisecond.

At 406, method 400 may include determining an updated frame number by adding a constant to the current frame number. Synchronization manager 16 may determine a constant 22 that accounts for a delay in performing a device initialization 20 that prepares all display devices 106, 108, 110, 112 for receiving audio data 12 to output via speakers 40, 44, 48, 52 on display devices 106, 108, 110. The device initialization 20 may including instructing the unit drivers 15, 17, 19, 21 to prepare the display device render buffers 32, 34, 36, 38. The value of constant 22 may provide enough time to initialize all of the display devices 106, 108, 110, 112 into a run state capable of receiving audio data 12. For example, constant 22 may be eight, which may allow eight milliseconds to move all of the display devices 106, 108, 110, 112 into the run state and start streaming audio data 12. Constant 22 may be modified as the time to move display devices 106, 108, 110, 112 increases or decreases. Moreover, constant 22 may increase and/or decrease as the number of display devices 106, 108, 110, 112 increase and/or decrease. As such, constant 22 may vary in response to changes in the system, changes in the system speed, and/or other considerations.

Synchronization manager 16 may calculate an updated frame number 24 by adding the constant 22 to the current frame number 18. The updated frame number 24 may be the specified timing indicator that may ensure that each of the display devices 106, 108, 110, 112 start outputting the audio data subsets 37, 39, 41, 43 at the same time.

At 408, method 400 may include generating a plurality of USB request blocks with the updated frame number and packets with the plurality of audio data subsets. The audio aggregator driver may send the updated frame number 24 and the audio data subsets 37, 39, 41, 43 to the unit drivers 15, 17, 19, 21 for transmission to the display devices 106, 108, 110, 112. Each unit driver 15, 17, 19, 21 may generate one or more USB requests blocks 30, 31, 33, 35 for the respective display device 106, 108, 110, 112. The USB requests blocks 30, 31, 33, 35 may include the updated frame number 24 and one or more packets 23, 25, 27, 29 (FIG. 3) of audio data subsets 37, 39, 41, 43.

For example, unit driver 15 may generate USB request block 30 with the updated frame number 24 and one or more packets 23 with a subset of audio data 37 for display device 106. Unit driver 17 may generate USB request block 31 with the updated frame number 24 and one or more packets 25 with a subset of audio data 39 for display device 108. Unit driver 19 may generate USB request block 33 with the updated frame number 24 and one or more packets 27 with a subset of audio data 41 for display device 110. Unit driver 21 may generate USB request block 35 with the updated frame number 24 and one or more packets 29 with a subset of audio data 43 for display device 112.

At 410, method 400 may include sending each USB request block of the plurality of USB request blocks to a corresponding display device of the plurality of display devices. A USB stack 28 may receive the USB request block(s) 30, 31, 33, 35 from unit drivers 15, 17, 19, 21. The USB request blocks 30, 31, 33, 35 with the updated frame number 24 and packets 23, 25, 27, 29 of audio data subsets 37, 39, 41, 43 may be sent to a respective display device render buffer 32, 34, 36, 38.

For example, USB request block 30 may be sent to display device render buffer 32 of display device 106, and display device render buffer 32 may output the audio data subset 37 via speaker 40 at the updated frame number 24. For example, when the timing of clock 11 matches the updated frame number 24, display device render buffer 32 may start outputting the audio data subset 37. In addition, USB request block 31 may be sent to display device render buffer 34 and display device render buffer 34 may output the audio data subset 39 using speaker 44 at the updated frame number 24. For example, when the timing of clock 11 equals the updated frame number 24, display device render buffer 34 may start outputting the audio data subset 39. USB request block 33 may be sent to display device render buffer 36 and display device render buffer 36 may output the audio data subset 43 via speaker 48 at the updated frame number 24. For example, when the timing of clock 11 reaches the updated frame number 24, display device render buffer 36 may start outputting the audio data subset 43. USB request block 35 may be sent to display device render buffer 38 and display device render buffer 38 may output the audio data subset 43 using speaker 52 at the updated frame number 24. For example, when the timing of clock 11 is the same as the updated frame number 24, display device render buffer 38 may start outputting the audio data subset 43.

As such, the display device render buffers 32, 34, 36, 38 may receive the audio data subsets 37, 39, 41, 43 from the USB request blocks 30, 31, 33, 35. Display devices 106, 108, 110, 112 may output the received audio data subsets 37, 39, 41, 43 via speakers 40, 44, 48, 52 at the updated frame number 24. The updated frame number 24 on each display device render buffer 32, 34, 36, 38 at any given point may be the same, allowing for meeting an expectation that the synchronization between all display devices 106, 108, 110, 112 may occur within a micro frame. The updated frame number 24 may be kept up to date by synchronization manager 16 as USB request blocks 30 are transferred from USB stack 28.

By setting a time in the future to start outputting the subsets of audio data 37, 39, 41, 43, that allows enough time to copy the subsets of audio data 37, 39, 41, 43 into the display device render buffers 32, 34, 36, 38, there may be a guarantee that the USB bus will deliver the subsets of audio data 37, 39, 41, 43 to all of the display devices 106, 108, 110, 112 at the exact same time. As such, the audio emitted from the speakers 40, 44, 48, 52 of display devices 106, 108, 110, 112 may be synchronized.

Figure 5:
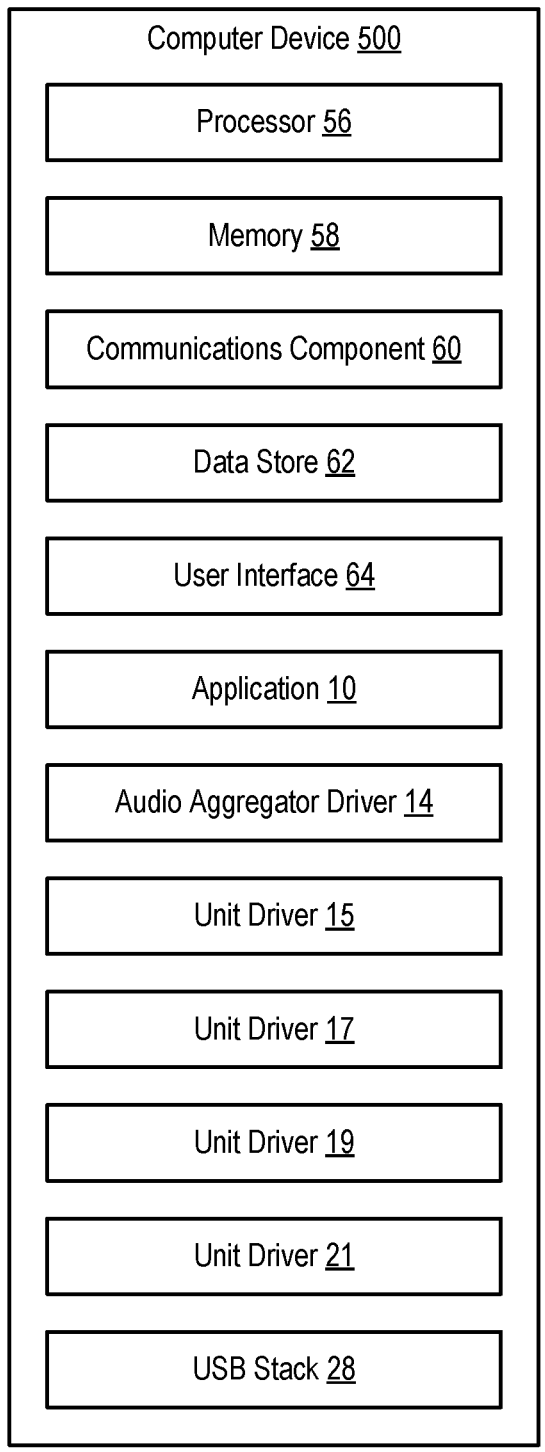
FIG. 5 is a schematic block diagram of an example device in accordance with an implementation of the present disclosure.

Referring now to FIG. 5 an example computer 500 that may be configured as computer device 102 in accordance with an implementation includes additional component details as compared to FIG. 1. In one example, computer 500 may include processor 56 for carrying out processing functions associated with one or more of components and functions described herein. Processor 56 can include a single or multiple set of processors or multi-core processors. Moreover, processor 56 can be implemented as an integrated processing system and/or a distributed processing system.

Computer 500 may further include memory 58, such as for storing local versions of applications being executed by processor 56. Memory 58 can include a type of memory usable by a computer, such as random access memory (RAM), read only memory (ROM), tapes, magnetic discs, optical discs, volatile memory, non-volatile memory, and any combination thereof. Additionally, processor 56 may include and execute operating system 111 (FIG. 1).

Further, computer 500 may include a communications component 60 that provides for establishing and maintaining communications with one or more parties utilizing hardware, software, and services as described herein. Communications component 60 may carry communications between components on computer device 102, as well as between computer device 102 and external devices, such as devices located across a communications network and/or devices serially or locally connected to computer device 102. For example, communications component 60 may include one or more buses, and may further include transmit chain components and receive chain components associated with a transmitter and receiver, respectively, operable for interfacing with external devices.

Additionally, computer 500 may include a data store 62, which can be any suitable combination of hardware and/or software, that provides for mass storage of information, databases, and programs employed in connection with implementations described herein. For example, data store 62 may be a data repository for applications 10, audio aggregator driver 14, unit driver 15, unit driver 17, unit driver 19, unit driver 21, and/or USB stack 28.

Computer 500 may also include a user interface component 64 operable to receive inputs from a user of computer device 102 and further operable to generate outputs for presentation to the user. User interface component 64 may include one or more input devices, including but not limited to a keyboard, a number pad, a mouse, display (e.g., which may be a touch-sensitive display), a navigation key, a function key, a microphone, a voice recognition component, any other mechanism capable of receiving an input from a user, or any combination thereof. Further, user interface component 64 may include one or more output devices, including but not limited to a display, a speaker, a haptic feedback mechanism, a printer, any other mechanism capable of presenting an output to a user, or any combination thereof.

In an implementation, user interface component 64 may transmit and/or receive messages corresponding to the operation of applications 10, audio aggregator driver 14, unit driver 15, unit driver 17, unit driver 19, unit driver 21, and/or USB stack 28. In addition, processor 56 executes applications 10, audio aggregator driver 14, unit driver 15, unit driver 17, unit driver 19, unit driver 21, and/or USB stack 28, and memory 58 or data store 62 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a memory to store data and instructions;
   at least one processor configured to communicate with the memory; and
   an operating system configured to communicate with the memory and the at least one processor, wherein the operating system is operable to:
      determine a plurality of audio data subsets with audio data from an audio stream to transmit to a plurality of display devices in communication with the computer device via a universal serial bus (USB) connection;
      obtain a current frame number of a display device render buffer from a first display device of the plurality of display devices;
      determine an updated frame number by adding a constant to the current frame number;
      generate a plurality of USB request blocks, where each USB request block of the plurality of USB request blocks includes the updated frame number and a packet with one audio data subset of the plurality of audio data subsets; and
      send each USB request block of the plurality of USB request blocks to a corresponding display device of the plurality of display devices.

2. The computer device of claim 1, wherein the constant is calculated in response to a delay in performing a device initialization that prepares each display device of the plurality of display devices to receive the plurality of audio data subsets.

3. The computer device of claim 2, wherein the constant changes in response to at least one of changes in a number of the plurality of display devices or a change in a speed to perform the device initialization.

4. The computer device of claim 1, wherein the operating system is further operable to:
   determine an order of the plurality of display devices in response to a sequencing of the plurality of display devices; and
   determine the first display device in response to the order.

5. The computer device of claim 1, wherein the operating system is further operable to:
   partition the audio stream into a number of sections, wherein the number of sections equals a number of the plurality of display devices multiplied by a number of channels supported by the plurality of display devices.

6. The computer device of claim 5, wherein the operating system is further operable to:
   determine a subset of the number of sections for each display device of the plurality of display devices, and
   include the audio data from the subset of the number of sections in the plurality of audio data subsets for each display device of the plurality of display devices.

7. The computer device of claim 1, wherein the computer device and each display device of the plurality of display devices share a USB clock.

8. The computer device of claim 7, wherein the operating system is further operable to obtain the current frame number of the display device render buffer in response to a timing of the USB clock.

9. The computer device of claim 1, wherein the operating system is further operable to:
   change the updated frame number after the plurality of USB request blocks are sent to each display device of the plurality of display devices.

10. A method for synchronizing audio data among a plurality of display devices in communication with a computer device, comprising:
    determine, at an operating system executing on the computer device, a plurality of audio data subsets with audio data from an audio stream to transmit to a plurality of display devices in communication with the computer device via a universal serial bus (USB) connection;
    obtaining a current frame number of a display device render buffer from a first display device of the plurality of display devices;
    determining an updated frame number by adding a constant to the current frame number;
    generating a plurality of USB request blocks, where each USB request block of the plurality of USB request blocks includes the updated frame number and a packet with one audio data subset of the plurality of audio data subsets; and
    sending each USB request block of the plurality of USB request blocks to a corresponding display device of the plurality of display devices.

11. The method of claim 10, wherein each display device of the plurality of display devices outputs the plurality of audio data subsets at the updated frame number.

12. The method of claim 10, wherein the constant is calculated in response to a delay in performing a device initialization that prepares each display device of the plurality of display devices to receive the plurality of audio data subsets.

13. The method of claim 12, wherein the constant changes in response to at least one of changes in a number of the plurality of display devices or a change in a speed to perform the device initialization.

14. The method of claim 10, further comprising:
    determining an order of the plurality of display devices in response to a sequencing of the plurality of display devices; and
    determining the first display device in response to the order.

15. The method of claim 10, further comprising:
partitioning the audio stream into a number of sections, wherein the number of sections equals a number of the plurality of display devices multiplied by a number of channels supported by the plurality of display devices.

16. The method of claim 15, wherein the method further comprises:
determining a subset of the number of sections for each display device of the plurality of display devices, and
including the audio data from the subset of the number of sections in the plurality of audio data subsets for each display device of the plurality of display devices.

17. The method of claim 10, wherein the computer device and each display device of the plurality of display devices share a USB clock.

18. The method of claim 17, wherein the current frame number of the display device render buffer is obtained in response to a timing of the USB clock.

19. The method of claim 10, wherein the method further comprises:
changing the updated frame number after the plurality of USB request blocks are sent to each display device of the plurality of display devices.

20. A non-transitory computer-readable medium storing instructions executable by a computer device, comprising:
at least one instruction for causing the computer device to determine a plurality of audio data subsets with audio data from an audio stream to transmit to a plurality of display devices in communication with the computer device via a universal serial bus (USB) connection;
at least one instruction for causing the computer device to obtain a current frame number of a display device render buffer from a first display device of the plurality of display devices;
at least one instruction for causing the computer device to determine an updated frame number by adding a constant to the current frame number;
at least one instruction for causing the computer device to generate a plurality of USB request blocks, where each USB request block of the plurality of USB request blocks includes the updated frame number and a packet with one audio data subset of the plurality of audio data subsets with one audio data subset of the plurality of audio data subsets; and
at least one instruction for causing the computer device to send each USB request block of the plurality of USB request blocks to a corresponding display device of the plurality of display devices.

* * * * *